March 5, 1940.　　　F. W. GOETZE　　　2,192,739
RETAINER FOR GASKETS
Filed Feb. 23, 1939　　　2 Sheets-Sheet 1
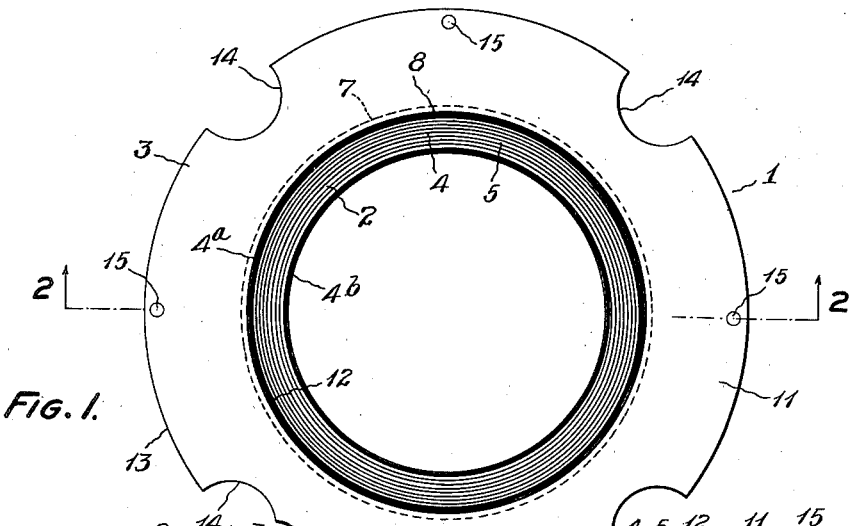
FIG. I.
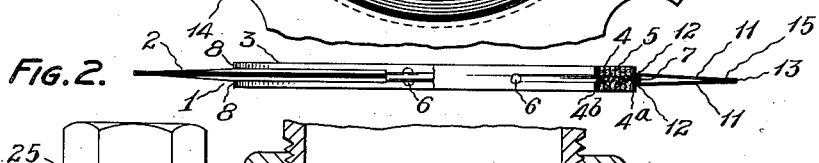
FIG. 2.
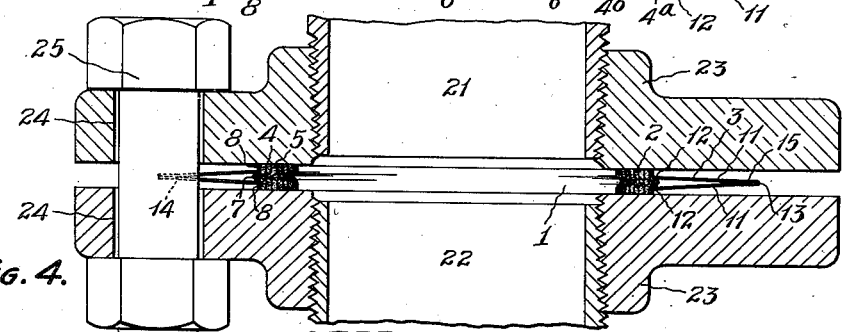
FIG. 4.
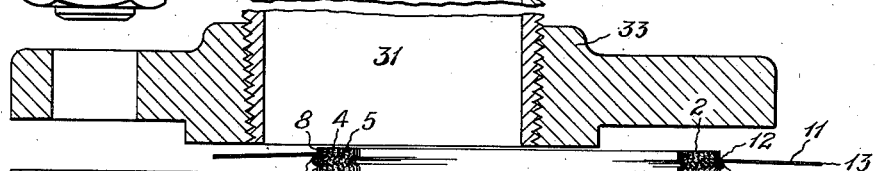
FIG. 5.
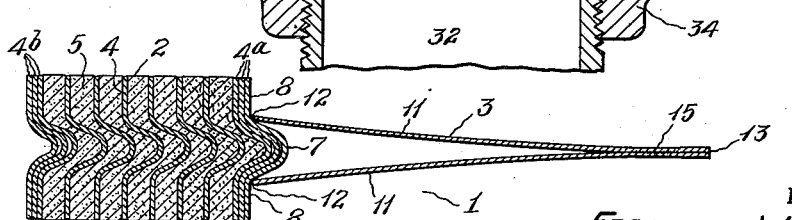
FIG. 3.
INVENTOR.
FREDERICK W. GOETZE
BY Herman Eisele
ATTORNEY.

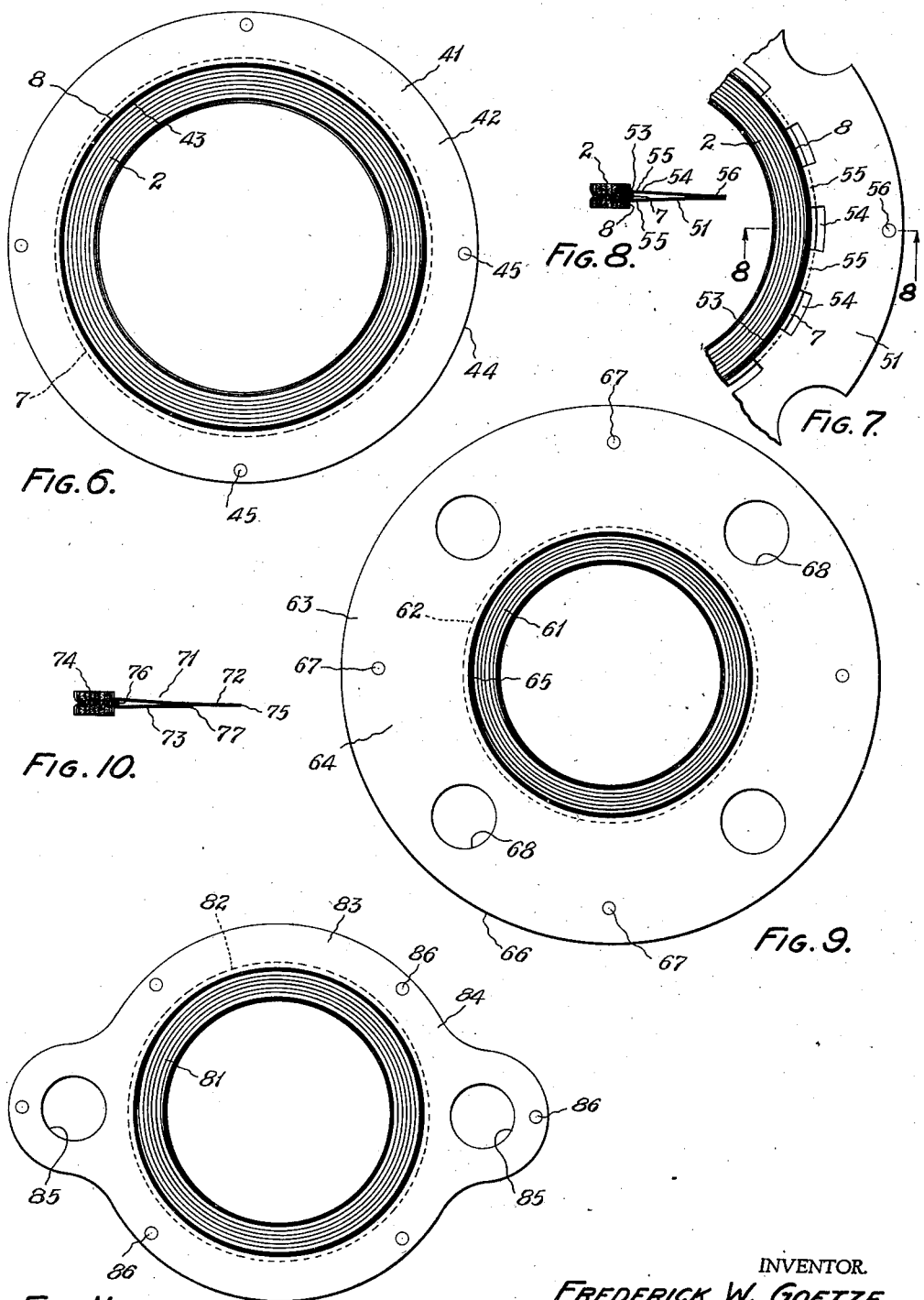

Patented Mar. 5, 1940

2,192,739

UNITED STATES PATENT OFFICE 2,192,739

RETAINER FOR GASKETS

Frederick W. Goetze, Plainfield, N. J.

Application February 23, 1939, Serial No. 258,077

3 Claims. (Cl. 288—27)

This invention relates to gaskets intended to be interposed between flanges of pipes or other plane surfaces for the purpose of sealing the joint formed by these surfaces.

More specifically this invention relates to a composite gasket assembly comprising a relatively narrow packing ring and an improved retainer or holding means for protecting the packing ring during handling and shipment, for centering the ring during assembling and for reinforcing the ring in service.

It is therefore an object of this invention to produce a composite gasket of this type in which the retainer effectively protects the packing ring from damage and distortion during packing, shipping and handling.

It is a further object of this invention to produce a retainer made of relatively stiff but pliable material which will not be broken or seriously damaged in shipping and handling and which can readily be satisfactorily restored to its original condition if it should become distorted, twisted or bent.

It is a further object of this invention to produce a gasket retainer which altho not fixedly secured to the packing ring, nevertheless firmly engages the outer periphery of the body of the ring and does not inadvertently become detached from the ring in handling.

It is a further object of this invention to produce a retainer formed of sheet metal which may be readily removed from the packing ring without distorting the packing ring when it is desired to use the packing ring in a joint where the retainer is not required.

It is a further object of this invention to produce a retainer which is made of relatively light and inexpensive metal which may be discarded when not required without involving serious monetary loss.

It is a further and more specific object of this invention to produce a gasket retainer formed of a pair of annular metal plates which are secured together and which resiliently but firmly grip a portion of the outer periphery of the gasket.

It is a further specific object to produce a two part gasket retainer in which the two parts are connected by frangible securing means which may readily be manually broken, permitting the separation of the two parts of the retainer and the release of the packing ring.

It is a further object of this invention to produce a retainer which is adapted to make aligning contact with bolts or other fastening devices or position determining elements of the structure to be sealed, in order that the packing ring may be properly positioned in the joints.

Further and more specific objects of this invention will become apparent from the following description and claims:

Referring to the drawings:

Fig. 1 is a plan view of one form of this improved composite gasket, this form comprising a spirally wound packing ring and a retainer provided with a plurality of semi-circular notches adapted to engage the bolts of the flange with which this gasket is intended to be used.

Fig. 2 is a sectional view of the gasket shown in Fig. 1, this view being taken on the plane indicated by line 2, 2 in Fig. 1.

Fig. 3 is an enlarged view of a portion of Fig. 2, clearly illustrating certain details of construction.

Fig. 4 is a vertical axial section showing adjacent ends of two aligned pipes, these pipe ends being provided with companion flanges, interposed between which is a composite gasket such as that illustrated in Figures 1 and 2.

Fig. 5 is a view similar to Fig. 4, showing adjacent ends of two pipes provided with male and female flanges and also showing a partially dismantled composite gasket assembly being placed into position.

Fig. 6 is a plan view similar to Fig. 1 and showing a composite gasket including a packing ring of substantially the same size as that shown in Fig. 1 but provided with a retainer of smaller diameter purposed to be engaged by the inside only of the flange bolts.

Fig. 7 is a fragmentary plan view illustrating a composite gasket similar to that shown in Fig. 1, formed with a modified contour of the inner periphery of the retainer.

Fig. 8 is a sectional view of the structure shown in Fig. 7, this view being taken on the plane indicated by line 8, 8 in Fig. 7.

Fig. 9 is a plan view similar to Fig. 1 of a composite gasket in which the retainer is made to extend substantially to the other periphery of the joint flanges, the retainer being formed with perforations for the flange bolts.

Fig. 10 is a fragmentary transverse section thru a gasket, similar to that illustrated in Fig. 9, in which the two plates of the retainer are not coextensive.

Fig. 11 is a plan view of another composite gasket which is formed with only two aligning openings, these openings being diametrically opposed.

Referring first to the form of this invention illustrated in Figures 1 to 4 inclusive, the composite gasket assembly is indicated generally at 1 and consists of a preferably compressible packing ring 2 held in a retainer or holding means 3.

The packing ring preferably consists of a continuous strip of metal spirally wound with non-metallic packing material between its convolutions, thus forming convolutions 4 of strip metal and interposed convolutions 5 of packing material. The metal of the convolutions 4 is formed, intermediate its edges, with a preferably centrally disposed corrugation forming an outwardly projecting bead intermediate two substantially straight cylindrical peripheral wall portions.

As will appear, both at the outer and inner periphery of the packing ring, the strip metal is wound upon itself for several turns as shown at 4a and 4b respectively, the terminal convolutions being spot welded as indicated at 6 or otherwise secured together. These terminal convolutions are provided and thus secured together to strengthen the inner and outer peripheries of the gasket and to prevent the unravelling of the winding in handling and service.

The corrugation in the outer terminal convolutions of the strip metal forms a continuous outwardly projecting bead or tongue 7 between two substantially cylindrical portions 8, 8. The width of the outwardly projecting bead is preferably about one-third the total thickness of the gasket and the sides of the bead preferably converge outwardly.

In the intermediate area of the packing ring formed by alternate strips of metal and packing, the packing runs from face to face of the packing ring and is effectively interlocked in the internested corrugations of the strip metal, as will clearly appear from Fig. 3. In the completed packing ring the width of the strip metal is preferably slightly less but substantially equal to the width of the packing material and to the thickness of the gasket ring.

The packing ring retainer or holding means consists of two preferably identical individual plates 11 made of relatively inexpensive thin metal which is comparatively stiff but sufficiently pliable to be manually bendable without fracturing. The material most frequently used is steel plate or "tin" plate preferably of an order of thickness ranging from .008" to .019", depending on the sizes of gaskets and conditions of service. These plates are in the form of continuous or endless annular discs and are formed with inner and outer peripheries indicated at 12 and 13 respectively. The size of the inner periphery 12 is substantially the same but sufficiently larger than the outer periphery of the cylindrical wall portions 8, 8 to permit the plates 11 to be readily mounted on the portions 8, 8 as clearly shown in Fig. 3. As will also appear, the periphery 12 is substantially smaller than the outer periphery of the bead 7. The outer periphery 13 is sized and formed to suit the character of the gasket aligning means of the joint which are to be utilized for centering the packing ring. In the embodiment disclosed in Figures 1 to 4, each plate is provided with preferably semi-circular recesses 14 of suitable size and spacing to engage the flange bolts with which the composite gasket is intended to be used and by which it is purposed to be located on the joint surfaces. One of the plates 11 is placed upon each of the cylindrical portions 8, that is, the plates are mounted on opposite sides of the packing ring and moved toward each other until the inner peripheries 12 abut the outwardly converging side surfaces of the bead 7. The plates are then further forced together in a suitable fixture if necessary, and secured together at points spaced from each other and located outwardly of the bead. The securing of these plates 11 may be affected in any desired or convenient manner. It is preferred to lightly spot weld the plates together at a plurality of points spaced from the inner periphery 12 of the plates and preferably adjacent the outer periphery of the plates, as indicated at 15. These spot welds are intended to be light spot welds, or tack welds which are sufficiently tenacious to hold the two plates 11 together firmly during shipping, handling and assembling but which are adapted to be readily broken apart by a suitable flat hand tool, such as a screw driver or knife blade, inserted between the plates adjacent the weld and twisted, thus moving the plates apart and tearing the weld. A weld of the desired tenacity is readily produced by controlling the pressure exerted by the electrodes and/or regulating the welding current. This manually breakable spot weld is designated in the claims as a "frangible" securing means.

It will be apparent that the two plates of the retainer or holding means will prevent any distortion or bending of the packing rings during handling, packing or shipping and that the rings will reach their destination in round condition.

While many services for a gasket of this type will occur to those skilled in this art, one application of the gasket is illustrated in Fig. 4 in which the gasket is used to seal a joint between a pair of flat flange faces. In this embodiment the adjacent ends of pipe elements are indicated at 21 and 22 each being provided with a companion flange indicated at 23. Shown interposed between these companion flanges is a composite gasket assembly 1, the semi-circular recesses 14 being aligned with the bolt openings 24 formed in the flanges. As will be understood, in assembling the gasket in the joint formed by the two flanges, it is necessary only to align the recesses 14 with the openings 24 in any convenient manner whereupon the gasket will be centered with relation to the flat surfaces of the flanges. It will be evident that the bolts 25 passing thru the bolt openings 24 and intersecting recesses 14 will accurately center the packing ring in the desired position in assembling and will maintain the gasket in this desired position.

The plates 11 being formed with an inner periphery 12 only slightly larger than the outer peripheries 8, 8 of the body of the packing ring are adapted to restrain the outer periphery of the ring from expanding beyond a predetermined extent fixed by the slight oversize of the periphery 12. It will accordingly be evident that the plates 11 will serve to prevent any unusual or unexpected expansion of the gasket in service due to internal pressure or for any other reason, due to the abutting of such expanded outer periphery of the packing ring against the inner periphery of the plates 11. As is well known to those skilled in the art, the welding at the outer periphery of the convolutions of metal strip sometimes fails, as a result of which the strip metal commences to unwind or unravel. It will be evident that the adjacent inner peripheries 12 of the plates 11 will prevent the unravelling of the outer convolutions of the packing ring to any serious extent.

In some types of installations, the retainer or holding means 3 may not be required and in other installations it may be impossible to install the packing ring when it is enclosed in the retainer or holding means. When it is desired to use the packing ring without the retainer, one or more of the welds are readily broken by means of a twisting action of a screw driver or other pointed tool manually inserted between the plates adjacent the welds. When all the welds are broken the plates may readily be removed from the packing ring. It will also be understood that it is possible to remove the packing ring by breaking only one or a few of the welds, this being effected by pulling the plates apart at the broken welds and bending them back to permit the ring to be removed edgewise.

It will also be understood that in some installations only one of the retainer plates may be desired or permissible. Such an installation is illustrated in Fig. 5 where two adjacent pipe elements are indicated at 31 and 32 provided with male and female flanges 33 and 34 respectively, the flange 34 being provided with a recess 35 in which the packing ring 2 is intended to be seated. Joints of this type are frequently found in existing installations in which the piping does not permit any considerable spreading of the flanges.

In order to assemble the packing ring between flanges of this type, the spot welds 15 may be manually broken and one plate 11 removed entirely and the remaining plate 11 maintained in position on the packing ring. This plate may then be used to control and slide the packing ring into position, as will be evident from an inspection of Fig. 5. After the packing ring 2 has been moved to the left as shown in that figure, sufficiently to register with the recess 35, the ring will drop into the recess whereupon the plate 11 may be removed, or in those cases in which the depth of the recess is less than the thickness of the gasket, as in the case illustrated, the plate may be permitted to remain in the joint and will serve to reinforce the outer periphery of the packing ring in service.

The modified form of composite gasket shown in Fig. 6 comprises a packing ring 2 substantially identical with that illustrated in Figs. 1 to 4. The retainer or centering means 41 in this form of this invention is somewhat smaller than that previously described, the inner periphery 43 of the coextensive plates 42 being formed to a snug fit on the peripheral portion 8 of the body of the ring while the outer periphery 44 of the plate is formed by a relatively smaller unbroken edge, suitably sized to engage the inner side only of the flange bolts. It is to be understood that the two plates 42 comprising the retainer 41 engage the opposite sides of the bead 7 and converge toward their outer periphery where they are secured by preferably tearable or frangible spot welds at 45.

The form of composite gasket shown fragmentarily in Figures 7 and 8 illustrates a modified type of retainer 51 mounted upon the peripheral walls 8 of the packing ring 2 formed with the bead 7. The retainer 51 as shown, is identical with that illustrated in Fig. 1, except that the inner periphery 53 of the plates 52, which snugly engages the ring walls 8, is interrupted at spaced intervals as shown at 54, forming tongues 55.

The plates 52 are spot welded as indicated at 56 or otherwise secured together to maintain the outer peripheries of the plates in contact with the tongues 55 resiliently engaging opposite sides of the bead 7 on the packing ring. It will be evident that the interrupted inner periphery 53 is, in many respects, equally as effective for the purpose intended as is the continuous inner periphery. It is also pointed out that, in the construction shown in Figures 7 and 8 the spot welds 56 may be permanent and not necessarily frangible in order to permit the disassociation of the packing rings and retainer. The material of the plates being pliable makes it possible to bend the tongues 55 upwardly and outwardly sufficiently to permit the removal of the packing ring.

The composite gasket shown in plan view in Fig. 9 illustrates a packing ring 61 formed with a bead 62 associated with a retainer 63 comprising two coextensive plates 64. The inner peripheries 65 of these plates snugly fit upon the body of the packing ring 61 and engage opposite sides of the bead 62. The outer peripheries 66 extend substantially to the outer periphery of the flanges with which this composite gasket is proposed to be used. The outer peripheries of the plates 64 are maintained in contact with each other by spot welds 67, thereby maintaining the inner peripheries in resilient engagement with the bead. The plates 64 are formed with openings 68 aligned with corresponding openings in the joint flanges and adapted to receive the flange bolts, thereby accurately positioning and firmly holding the gasket in place in the joint.

It will be evident that the two individual plates of the retainer need not necessarily be coextensive at their outer periphery. Fig. 10 illustrates a composite gasket of this type in which the retainer 71 comprises an upper plate 72 and a lower plate 73. The inner peripheries of both of these plates are formed for a snug fit on the packing ring 74 and the outer periphery 75 of the upper plate 72 is presumed to extend outwardly presumably to the periphery of the joint flanges while the outer periphery 77 of the lower plate 73 extends outwardly only to a sufficient extent to provide space to apply the spot welds required to secure the two retainer plates together and to satisfactorily mount them on the bead 76 of the packing ring 74. This arrangement effects a considerable saving in material and shipping costs.

Fig. 11 illustrates a still further modification of retainer in which the packing ring 81 is formed with the bead 82 held in the retainer 83 comprising two coextensive plates 84. In this instance the retainer plates are formed with only two aligning openings 85, the plates being spot welded together at a plurality of spaced points as indicated at 86.

It will be understood that in this composite gasket the packing ring and holder need not be circular. These parts may be elliptical, rectangular or of any other contour conforming to the requirements of the surfaces to be sealed.

Many modifications might also be made in the means for securing the two plates of the retainer to each other. For instance, the welds might be located at other points than those shown, and might even be formed across the extreme outer edges of the plates.

Any other type of securing means might be substituted for the spot welds specified such as soldering, riveting, interlocking lips formed from the metal, and the like.

Packing rings, also need not necessarily be formed of alternate layers of metal and packing material. Any other construction of packing ring may be used, it being essential only that a suitable peripheral conformation be provided for an effective cooperation with the inner peripheries of the retainer plates.

It is also to be noted that the thickness of the plates is not necessarily limited to the thickness specified, and may be varied to suit the conditions.

Many other modifications of this invention, in its construction and its application, in addition to the forms shown will naturally occur to those skilled in this art, and the present disclosures should therefore be considered as typical only and applicant desires not to be limited to the exact construction shown and described.

What I claim is:

1. A retainer adapted to be applied to a gasket formed of spirally wound alternate metal and packing material strips and having a peripheral bead, said retainer comprising a pair of superposed annular metallic plates, the face of one of said plates being in substantial engagement with the other at its periphery and said plates being slightly spaced apart at their inner peripheries for engagement with opposite sides of said bead, said plates being held in engagement with each other by manually frangible securing means at a plurality of spaced points for facilitating removal of the plates by manual rupture of said securing means.

2. A retainer adapted to be applied to a gasket formed of spirally wound alternate metal and packing material strips and having a peripheral bead, said retainer comprising a pair of superposed annular pliable metallic plates, and means securing the face of one of said plates in substantial engagement with the other at its periphery, said plates being slightly spaced apart at their inner peripheries for engagement with opposite sides of said bead and being interrupted at spaced intervals about their inner peripheries to form a series of tongues which may be bent out to facilitate removal of the plates.

3. A retainer adapted to be applied to a gasket formed of spirally wound alternate metal and packing material having a peripheral wall normal to the sealing surfaces of the gasket and having a bead in the intermediate zone of said wall, said retainer comprising a pair of superposed metallic plates each having a substantially central opening defined by an inner edge of the plate and formed to the outline of the gasket wall on opposite sides of said bead, and means holding the plates in substantial engagement with each other at the periphery of at least one of the plates and holding said inner edges of the plates spaced apart by said bead and in substantial engagement with the gasket wall on opposite sides of said bead.

FREDERICK W. GOETZE.